United States Patent
Kamimae et al.

(10) Patent No.: US 9,631,342 B2
(45) Date of Patent: Apr. 25, 2017

(54) WORK VEHICLE

(71) Applicant: KOMATSU LTD., Tokyo (JP)

(72) Inventors: Takeshi Kamimae, Kanazawa (JP);
Yutaka Tanaka, Komatsu (JP);
Norihito Bando, Komatsu (JP);
Kazunori Kamei, Kanazawa (JP);
Kenji Hiraoka, Hitachinaka (JP);
Yasufumi Ohchi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/654,887

(22) PCT Filed: Aug. 19, 2014

(86) PCT No.: PCT/JP2014/071638
§ 371 (c)(1),
(2) Date: Jun. 23, 2015

(87) PCT Pub. No.: WO2015/079749
PCT Pub. Date: Jun. 4, 2015

(65) Prior Publication Data
US 2016/0053463 A1 Feb. 25, 2016

(51) Int. Cl.
*B62D 25/10* (2006.01)
*E02F 9/08* (2006.01)
(Continued)

(52) U.S. Cl.
CPC ............ *E02F 9/0883* (2013.01); *B60K 11/04* (2013.01); *B60K 13/04* (2013.01); *E02F 3/283* (2013.01);
(Continued)

(58) Field of Classification Search
CPC ........ B60K 13/04; B60K 13/06; B60K 11/00; B60K 11/04; F01N 2590/08;
(Continued)

(56) References Cited

U.S. PATENT DOCUMENTS

| 4,133,547 A * | 1/1979 | Fox ........................ B60K 13/04 123/41.64 |
| 5,193,636 A * | 3/1993 | Holm ..................... B60K 11/08 180/68.1 |

(Continued)

FOREIGN PATENT DOCUMENTS

| EP | 2 314 537 A1 | 4/2011 |
| EP | 2 587 068 A2 | 5/2013 |

(Continued)

OTHER PUBLICATIONS

International Search Report for the corresponding international application No. PCT/JP2014/071638, issued on Aug. 19, 2014.
(Continued)

*Primary Examiner* — J. Allen Shriver, II
*Assistant Examiner* — Travis Coolman
(74) *Attorney, Agent, or Firm* — Global IP Counselors, LLP (57) ABSTRACT

A wheel loader includes an engine, an engine compartment, an injection device, a top plate and a first guide member. The injection device is disposed in the engine compartment. The top plate has a ventilation part. The ventilation part is disposed in a position horizontally away from the injection device. The first guide member has a guide body. The guide body is disposed along the top plate to direct air existing over the injection device to the ventilation part.

17 Claims, 11 Drawing Sheets (51) Int. Cl.
    *B60K 11/04*    (2006.01)
    *B60K 13/04*    (2006.01)
    *F01N 3/20*     (2006.01)
    *F01N 3/021*    (2006.01)
    *F01N 13/00*    (2010.01)
    *E02F 3/28*     (2006.01)
    *E02F 3/34*     (2006.01)

(52) U.S. Cl.
    CPC .......... *E02F 9/0841* (2013.01); *E02F 9/0866* (2013.01); *E02F 9/0891* (2013.01); *F01N 3/021* (2013.01); *F01N 3/2066* (2013.01); *F01N 13/009* (2014.06); *B60Y 2200/415* (2013.01); *E02F 3/3411* (2013.01); *F01N 2260/022* (2013.01); *F01N 2590/08* (2013.01); *F01N 2610/02* (2013.01); *F01N 2610/1453* (2013.01); *Y02T 10/24* (2013.01)

(58) Field of Classification Search
    CPC ............. F01N 2340/04; F01N 13/1822; F01N 13/1805; B62D 25/10; B62D 25/12
    See application file for complete search history.

(56) References Cited

U.S. PATENT DOCUMENTS

| | | | | |
|---|---|---|---|---|
| 6,167,976 B1* | 1/2001 | O'Neill | ................. | B62D 25/10 123/41.49 |
| 6,655,486 B2* | 12/2003 | Oshikawa | ............. | B60K 11/08 180/68.1 |
| 6,901,903 B2* | 6/2005 | Nakajima | .............. | B60K 11/04 123/196 AB |
| 7,717,205 B2* | 5/2010 | Kertz | ..................... | B60K 13/04 180/68.1 |
| 8,186,153 B2* | 5/2012 | Schindler | ................ | F01N 3/021 180/68.2 |
| 8,505,661 B2* | 8/2013 | Tsuji | ..................... | E02F 3/7609 180/68.4 |
| 8,516,807 B2* | 8/2013 | Kosaka | ............... | F01N 13/1822 60/297 |
| 8,931,266 B2* | 1/2015 | Uchida | ................... | B60K 13/04 180/296 |
| 9,003,779 B2* | 4/2015 | Kanamori | ............... | F01N 3/208 60/295 |
| 9,016,428 B2* | 4/2015 | Numa | ................... | F01N 3/2066 180/296 |
| 9,033,081 B1* | 5/2015 | Yamagoe | ............... | B60K 11/02 180/68.1 |
| 9,080,307 B2* | 7/2015 | Numa | ..................... | B60K 11/06 |
| 9,194,104 B2* | 11/2015 | Kanamori | ................. | B60R 3/00 |
| 9,238,901 B2* | 1/2016 | Kamimae | ............... | B60K 13/04 |
| 9,309,643 B2* | 4/2016 | Yamagoe | ................ | F01N 13/08 |
| 2002/0017408 A1* | 2/2002 | Oshikawa | ............... | B60K 11/08 180/69.2 |
| 2003/0066209 A1* | 4/2003 | Takezaki | ................ | B60K 11/08 37/197 |
| 2010/0031644 A1* | 2/2010 | Keane | .................... | B60K 13/04 60/295 |
| 2010/0186381 A1* | 7/2010 | Charles | .................. | F01N 3/025 60/282 |
| 2011/0203864 A1* | 8/2011 | Ryczek | .................. | B62D 25/10 180/69.24 |
| 2013/0175109 A1* | 7/2013 | Takatsuji | ............... | B60K 13/04 180/309 |
| 2013/0291523 A1* | 11/2013 | Shah | ..................... | F01N 3/2066 60/287 |
| 2013/0319787 A1* | 12/2013 | Kobayashi | ............ | E02F 9/0866 180/309 |
| 2014/0238767 A1* | 8/2014 | Numa | .................... | F01N 3/2066 180/309 |
| 2014/0299401 A1* | 10/2014 | Nakagami | ............. | E02F 9/0866 180/309 |
| 2014/0326527 A1* | 11/2014 | Harada | .................. | E02F 9/0866 180/309 |
| 2015/0068470 A1* | 3/2015 | Tsutsumi | ................ | B60K 11/04 123/41.7 |
| 2015/0075894 A1* | 3/2015 | Kamimae | ............. | E02F 9/0833 180/309 |
| 2015/0128035 A1 | 5/2015 | Takae | | |
| 2015/0176451 A1* | 6/2015 | Tsutsumi | ................ | B01D 53/86 60/298 |
| 2015/0198075 A1* | 7/2015 | Gong | .................... | F01N 3/2066 60/274 |
| 2015/0337520 A1* | 11/2015 | Yabe | ..................... | E02F 3/3411 180/68.1 |
| 2016/0024752 A1* | 1/2016 | Mitsuda | ................ | E02F 9/0866 180/296 |
| 2016/0053645 A1* | 2/2016 | Sandou | ................. | F01N 3/2066 60/301 |

FOREIGN PATENT DOCUMENTS

| | | |
|---|---|---|
| EP | 2 735 711 A1 | 5/2014 |
| JP | 50-52636 | 5/1975 |
| JP | 55-78718 | 5/1980 |
| JP | 57-133416 | 8/1982 |
| JP | 10-338036 A | 12/1998 |
| JP | 2000-62475 A | 2/2000 |
| JP | 2005-289277 A | 10/2005 |
| JP | 2007-217151 A | 8/2007 |
| JP | 2014-25254 B1 | 1/2013 |
| JP | 5329009 B1 | 10/2013 |
| JP | 2013-242710 A | 12/2013 |
| WO | 2013/175981 A1 | 11/2013 |

OTHER PUBLICATIONS

The Supplemental Partial European Search Report for the corresponding European application No. 14 86 6115, dated on Dec. 2, 2015.
The extended European search report for the corresponding European application No. 14866115.0 issued on Mar. 17, 2016.
The Office Action for the corresponding Chinese application No. 201480003695.7, issued on Nov. 1, 2016.

* cited by examiner

WORK VEHICLE

CROSS-REFERENCE TO RELATED APPLICATIONS

This application is a U.S. National stage application of International Application No. PCT/JP2014/071638, filed on Aug. 19, 2014.

BACKGROUND

The present invention relates to a work vehicle.

A work vehicle has an engine compartment. An engine is accommodated in the engine compartment. Additionally, a variety of devices other than the engine may be accommodated in the engine compartment. For example, in a work vehicle disclosed in Japan Laid-open Patent Application Publication No. 2014-025254, an exhaust gas post-processing device is accommodated in the engine compartment to process exhaust gas from the engine.

SUMMARY

When the engine or a variety of devices accommodated in the engine compartment generate heat during actuation, temperature in the engine compartment inevitably increases. Hence, respective members disposed in the engine compartment are exposed to hot air and so forth in the engine compartment. When a member for which high temperature is not preferable is mounted in the engine compartment, it is preferable to inhibit the member from being exposed to hot air in the engine compartment.

It is an object of the present invention to inhibit a cooling target member disposed in the engine compartment from being exposed to hot air.

A work vehicle according to an aspect of the present invention includes an engine, an engine compartment, a cooling target member, a top plate and a first guide member. The engine compartment accommodates the engine. The cooling target member is disposed in the engine compartment. The top plate has a ventilation part. The ventilation part is disposed in a position horizontally away from the cooling target member. The top plate defines a top face of the engine compartment. The first guide member has a cutout part or a first opening part disposed over the cooling target member. The first guide member extends from the cutout part or the first opening part to the ventilation part and covers the ventilation part from below.

According to the construction, when hot air exists around the cooling target member, the hot air rises to the top plate and is directed to the ventilation part by the first guide member. Then, the hot air is discharged to the outside of the engine compartment through the ventilation part. With the construction, the cooling target member disposed in the engine compartment can be inhibited from being exposed to the hot air.

Additionally, the ventilation part is not disposed immediately above the cooling target member but disposed in a position horizontally away from the cooling target member. With the construction, the cooling target member can be prevented from being exposed to rainwater and so forth falling through the ventilation part.

Preferably, the work vehicle further includes a second guide member. The second guide member extends in an up-and-down direction between the cutout part or the first opening part and the cooling target member. According to the construction, when hot air exists around the cooling target member, the hot air is directed to the cutout part or the first opening part by the second guide member.

Preferably, the second guide member and a lateral face of the engine compartment form a channel extending over the cooling target member in the up-and-down direction. According to the construction, it is possible to cause hot air existing around the cooling target member to efficiently rise by a stack effect that utilizes the channel extending in the up-and-down direction.

Preferably, the second guide member has a semi-cylindrical shape.

Preferably, the first guide member further has a folded part. The folded part extends upward on a circumferential edge of the cutout part or the first opening part. According to the construction, the folded part can prevent rainwater attached to the first guide member from falling on the cooling target member through the cutout part or the first opening part.

Preferably, the first guide member has a plate shape and is attached to the top plate.

Preferably, the first guide member further has an extending part extending to the outside of the engine compartment. According to the construction, water received by the first guide member can be discharged to the outside of the engine compartment through the extending part.

Preferably, the extending part extends rearward of the engine compartment. The first guide member tilts down rearward. According to the construction, water received by the first guide member can be discharged to the rearward of the engine compartment.

Preferably, the extending part has a first extending part and a second extending part. The first extending part extends rearward along a right lateral face of the engine compartment. The second extending part extends rearward along a left lateral face of the engine compartment. The top plate has a second opening part extending in a vehicle width direction. The first extending part is disposed on the right side of the second opening part in a plan view. The second extending part is disposed on the left side of the second opening part in the plan view. The second opening part is covered with a detachable cover. With the construction, detachment of the cover enables maintenance for the respective devices accommodated in the engine compartment through the second opening part.

Preferably, the second guide member is attached at an upper end thereof to the first guide member.

Preferably, the work vehicle further includes a selective catalytic reduction device and a connection pipe. The selective catalytic reduction device is configured to process exhaust gas from the engine. The connection pipe is connected to the selective catalytic reduction device. The aforementioned cooling target member is, for instance, an injection device. The injection device is configured to inject a reductant into the connection pipe.

According to the present invention, a cooling target member disposed in an engine compartment can be inhibited from being exposed to hot air.

DETAILED DESCRIPTION OF EXEMPLARY EMBODIMENTS

Figure 1:
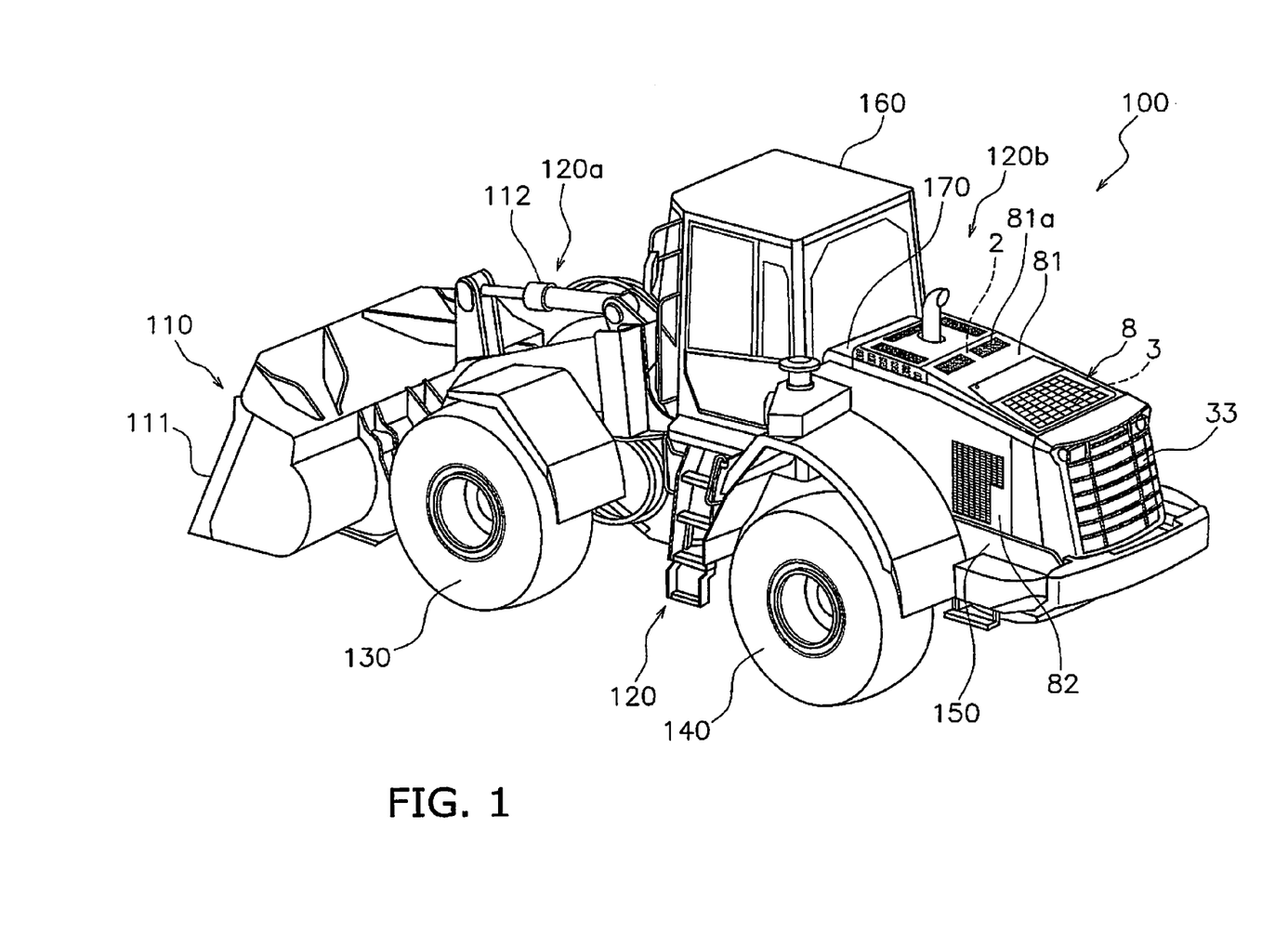
FIG. 1 is a perspective view of a wheel loader.

An exemplary embodiment of a wheel loader as an exemplary work vehicle according to the present invention will be hereinafter explained with reference to drawings. FIG. 1 is an external perspective view of a wheel loader 100 seen from a rear left side thereof. It should be noted that in the following explanation, the terms "right", "left", "up" and "down" indicate directions defined on the basis of a front view from an operator's room. The term "vehicle width direction" is synonymous to the term "right-and-left direction". Additionally, the term "back-and-forth direction" means a back-and-forth direction of a vehicle body.

As shown in FIG. 1, the wheel loader 100 includes a work implement 110, a vehicle body 120, front wheels 130 and rear wheels 140. The present wheel loader 100 can be self-propelled when the front wheels 130 and the rear wheels 140 are driven and rotated, and is configured to perform a desired work with the work implement 110.

The work implement 110 is a mechanism configured to be driven by operating oil pressurized by a hydraulic pump, and is disposed forward of the vehicle body 120. The work implement 110 includes a bucket 111, a boom (not shown in the drawings), a lift cylinder (not shown in the drawings) and a bucket cylinder 112. The bucket 111 is attached to the tip end of the boom. The boom is a member for lifting up the bucket 111. The boom is mounted to the front part of a front side vehicle body 120a to be described. The lift cylinder is configured to drive the boom by pressurized oil to be discharged from a work implement pump. The bucket cylinder 112 is configured to drive the bucket 111 by the pressurized oil to be discharged from the work implement pump.

The vehicle body 120 includes the front side vehicle body 120a and a rear side vehicle body 120b. The front side vehicle body 120a and the rear side vehicle body 120b are joined to each other to be pivotable in the right-and-left direction. The work implement 110 and the front wheels 130 are mounted to the front side vehicle body 120a. The rear wheels 140 are mounted to the rear side vehicle body 120b.

The rear side vehicle body 120b includes a vehicle body frame 150, a cab 160, an engine compartment 2 and a cooling compartment 3. The vehicle body frame 150 is a frame composing a part of the rear side vehicle body 120b. The vehicle body frame 150 supports the rear wheels 140, the cab 160, an operating oil tank 170, an engine 11 (see FIG. 2) and so forth.

The operator's room is installed in the interior of the cab 160, and a variety of operating members and an operating panel are mounted thereto. The operating oil tank 170 is disposed rearward of the cab 160. A plurality of hydraulic pumps (not shown in the drawings) are disposed beneath the operating oil tank 170. The operating oil tank 170 stores the operating oil for driving the work implement 110 and so forth, and the hydraulic pumps are configured to supply the operating oil to the work implement 110 and so forth.

Figure 2:
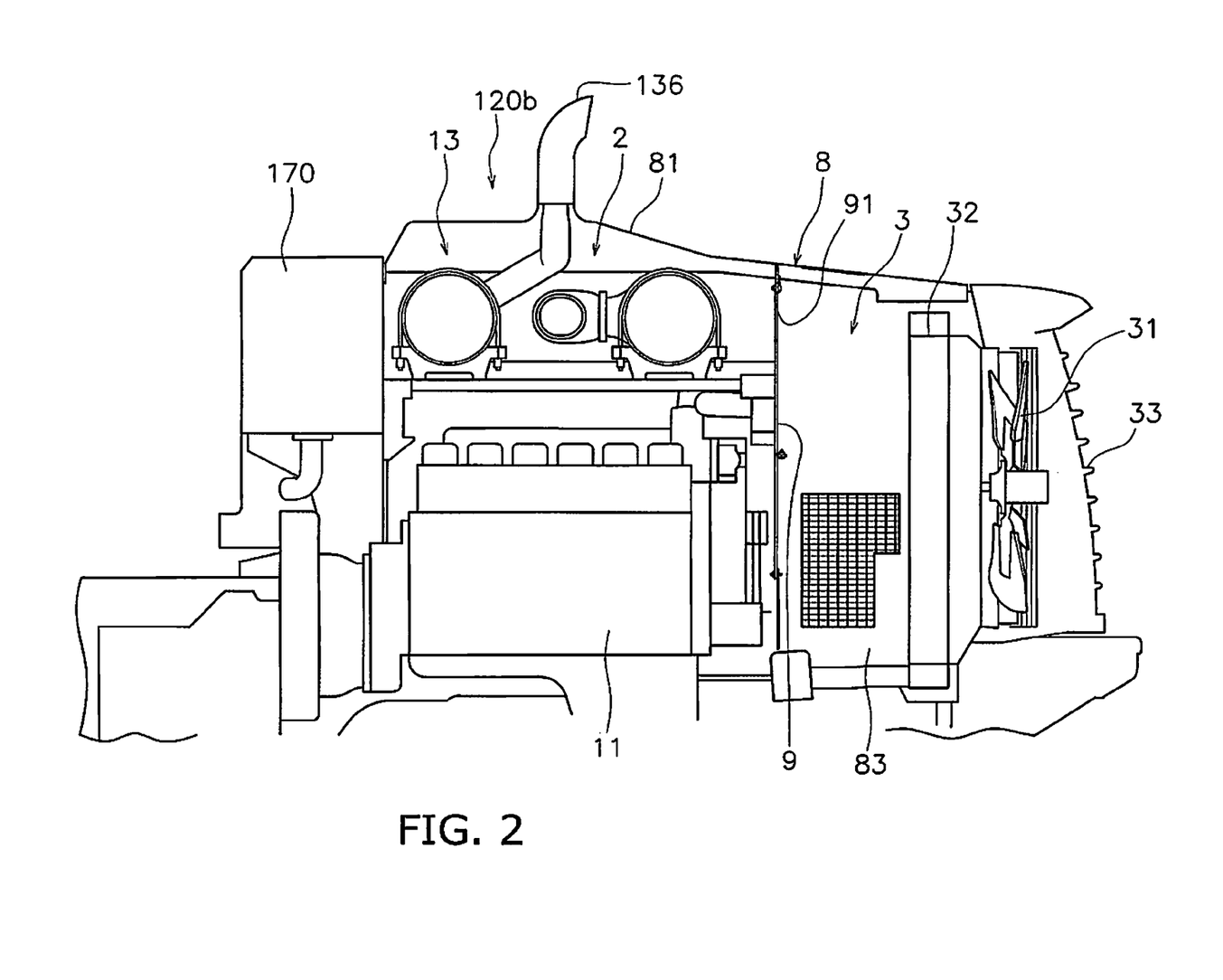
FIG. 2 is a cross-sectional view of a rear side vehicle body.

FIG. 2 is a cross-sectional side view of the rear side vehicle body 120b seen from left side. As shown in FIG. 2, the engine compartment 2 is defined by a vehicle body cover 8. The engine compartment 2 is disposed rearward of the cab 160. The operating oil tank 170 is located between the cab 160 and the engine compartment 2.

As shown in FIG. 1, the vehicle body cover 8 has a top plate 81, a first side plate 82 and a second side plate 83 (see FIG. 2). The top plate 81 defines the top face of the engine compartment 2. The first and second side plates 82 and 83 define the lateral faces of the engine compartment 2. When described in detail, the first side plate 82 defines the left lateral face of the engine compartment 2, whereas the second side plate 83 defines the right lateral face of the engine compartment 2.

Figure 3:
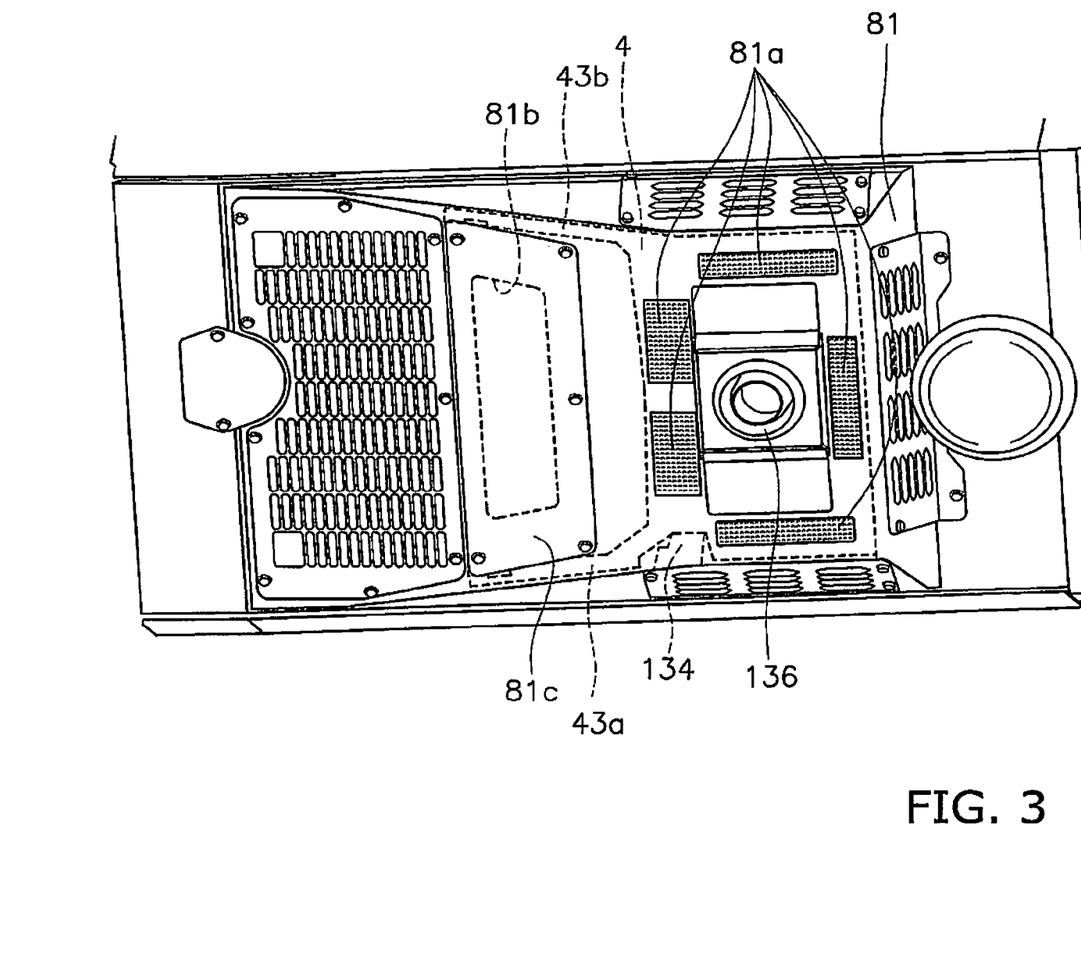
FIG. 3 is a plan view of the rear side vehicle body.

FIG. 3 is a plan view of the rear vehicle body. As shown in FIG. 3, the top plate 81 has at least one ventilation part 81a. It should be noted that in the present exemplary embodiment, the top plate 81 has a plurality of ventilation parts 81a. The respective ventilation parts 81a are disposed in positions horizontally away from a cooling target member 134. Put differently, the respective ventilation parts 81a are formed in such positions as not to overlap with the cooling target member 134 in a plan view. It should be noted that in the present exemplary embodiment, the cooling target member 134 is an injection device 134 to be described.

Each ventilation part 81a is composed of, for instance, a plurality of through holes. The plurality of through holes, composing each ventilation part 81a, penetrate the top plate 81 in the up-and-down direction. The respective ventilation parts 81a are disposed in the surrounding of an exhaust pipe 136 to be described. Specifically, one ventilation part 81a is disposed forward of the exhaust pipe 136, one ventilation part 81a is disposed on the right side of the exhaust pipe 136, one ventilation part 81a is disposed on the left side of the exhaust pipe 136, and two ventilation parts 81a are disposed rearward of the exhaust pipe 136. It should be noted that in FIG. 3, a first guide member 4 is depicted with a dashed line for understanding the positional relation between the respective ventilation parts 81a and the first guide member 4 to be described.

The top plate 81 has an opening part 81b. The opening part 81b is disposed rearward of the respective ventilation parts 81a. The opening part 81b extends in the vehicle width direction. When described in detail, the vehicle width directional length of the opening part 81b is longer than the back-and-forth directional length thereof. It should be noted that the opening part 81b of the top plate 81 corresponds to a second opening part of the present invention. The opening part 81b is covered with a cover 81c. The cover 81c is detachably attached to the top plate 81. For example, the cover 81c is attached to the top plate 81 by fastening members, such as bolts.

As shown in FIG. 2, the engine compartment 2 accommodates the engine 11, an exhaust gas post-processing device 13 and so forth. The engine 11 is a so-called vertical mount engine that is disposed in the lower region of the engine compartment 2 and has a crankshaft extending in the back-and-forth direction.

Figure 4:
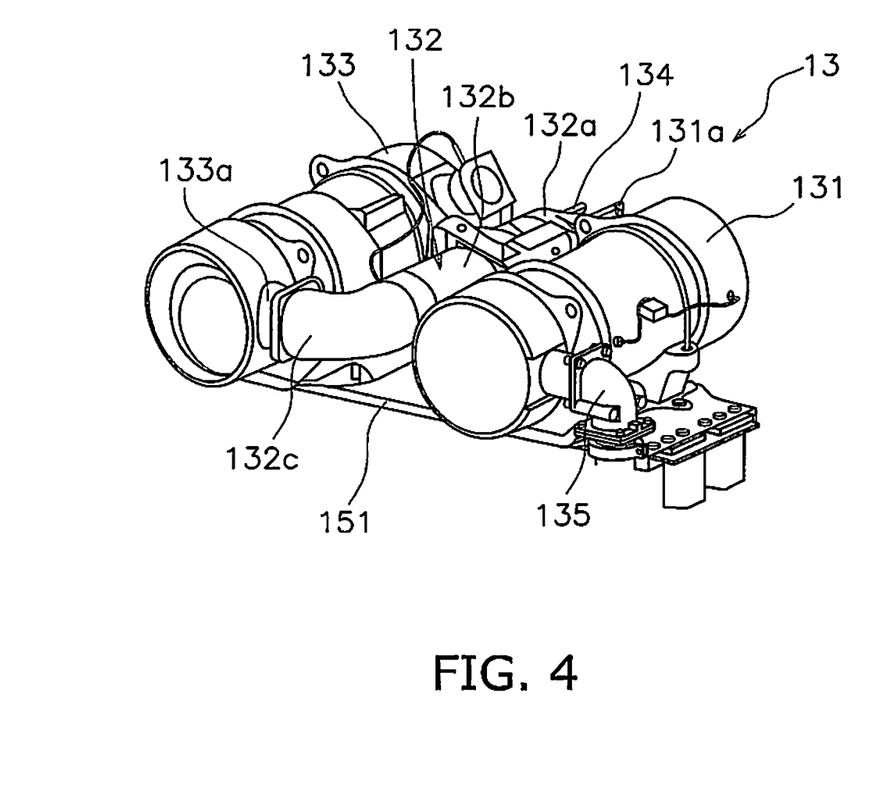
FIG. 4 is a perspective view of an exhaust gas post-processing device.

The exhaust gas post-processing device 13 is disposed in the upper region of the engine compartment 2. Put differently, the exhaust gas post-processing device 13 is disposed over the engine 11. FIG. 4 is a perspective view of the exhaust gas post-processing device 13 seen from a rear left side thereof.

As shown in FIG. 4, the exhaust gas post-processing device 13 includes a diesel particulate filter device 131, a connection pipe 132 and a selective catalytic reduction device 133, and exhaust gas flows through the components in this order. The injection device 134 is attached to the connection pipe 132. It should be noted that the injection device 134 corresponds to a cooling target member of the present invention.

The diesel particulate filter device 131 is connected to the engine 11 through a conduit 135. The diesel particulate filter device 131 is a device for processing exhaust gas to be discharged from the engine 11.

Specifically, the diesel particulate filter device 131 is a device for trapping particulate materials, such as soot, contained in the exhaust gas to be discharged from the engine 11 with a filter. The diesel particulate filter device 131 is configured to burn the trapped particulate materials with a heater mounted to the filter. It should be noted that the diesel particulate filter device 131 is supported by a support member 151 to be attached to the vehicle body frame 150.

The connection pipe 132 is connected to the selective catalytic reduction device 133. When described in detail, the connection pipe 132 connects between the diesel particulate filter device 131 and the selective catalytic reduction device 133.

The connection pipe 132 entirely has an S shape and is composed of a first bent part 132a, a straight part 132b and a second bent part 132c. The first bent part 132a is connected to an exhaust gas outlet port 131a of the diesel particulate filter device 131. The second bent part 132c is connected to an exhaust gas inlet port 133a of the selective catalytic reduction device 133. The straight part 132b extends between the first bent part 132a and the second bent part 132c.

The injection device 134 is attached to the first bent part 132a. The injection device 134 is a device for injecting aqueous urea into the connection pipe 132. The aqueous urea is configured to be drawn from an aqueous urea tank (not shown in the drawings) by a pump (not shown in the drawings) and to be supplied to the injection device 134 through a conduit (not shown in the drawings). The aqueous urea, injected into the connection pipe 132, is turned into ammonia through hydrolysis by the heat of the exhaust gas. The ammonia is supplied together with the exhaust gas to the selective catalytic reduction device 133 through the connection pipe 132.

The selective catalytic reduction device 133 is a device for purifying exhaust gas by reducing nitrogen oxides contained in the exhaust gas with use of the aforementioned ammonia as a reductant. Similarly to the diesel particulate filter device 131, the selective catalytic reduction device 133 is supported by the support member 151.

The diesel particulate filter device 131 and the selective catalytic reduction device 133 are disposed in parallel alignment. Specifically, the diesel particulate filter device 131 and the selective catalytic reduction device 133 both have substantially cylindrical shapes. The diesel particulate filter device 131 and the selective catalytic reduction device 133 are disposed such that the center axes thereof extend roughly in parallel to each other in the vehicle width direction. Additionally, the straight part 132b of the connection pipe 132 also has a substantially cylindrical shape and the axis thereof extends in the vehicle width direction. Put differently, the center axis of the straight part 132b of the connection pipe 132 is disposed roughly in parallel to the center axes of the diesel particulate filter device 131 and the selective catalytic reduction device 133. It should be noted that the diesel particulate filter device 131, the selective catalytic reduction device 133 and the straight part 132b may not be disposed in parallel to each other. Additionally, the respective center axes of the diesel particulate filter device 131, the selective catalytic reduction device 133 and the straight part 132b may not extend in the vehicle width direction.

As shown in FIG. 2, the exhaust pipe 136 is a pipe for discharging the exhaust gas processed by the exhaust gas post-processing device 13 to the outside. When described in detail, the exhaust pipe 136 is connected to the selective catalytic reduction device 133, and discharges the exhaust gas processed by the selective catalytic reduction device 133 to the outside.

The cooling compartment 3 is disposed rearward of the engine compartment 2. The engine compartment 2 and the cooling compartment 3 are divided through a partition wall 9. The partition wall 9 has a communication port 91. The engine compartment 2 and the cooling compartment 3 communicate through the communication port 91.

Similarly to the engine compartment 2, the cooling compartment 3 is defined by the vehicle body cover 8. When described in detail, the top face of the cooling compartment 3 is defined by the top plate 81, whereas the lateral faces of the cooling compartment 3 are defined by first and second side plates 82 and 83.

When described in detail, the front part of the top plate 81 defines the top face of the engine compartment 2, whereas the rear part of the top plate 81 defines the top face of the cooling compartment 3. Additionally, the front parts of the first and second side plates 82 and 83 define the lateral faces of the engine compartment 2, whereas the rear parts of the first and second side plates 82 and 83 define the lateral faces of the cooling compartment 3.

The cooling compartment 3 accommodates a radiator 32 and a cooling fan 31. The radiator 32 cools down cooling water of the engine 11. The cooling fan 31 rotates to discharge air existing in the cooling compartment 3 to the outside of the cooling compartment 3. When described in detail, the cooling fan 31 rotates to discharge the air existing in the cooling compartment 3 to the outside of the cooling compartment 3 through a grill 33. Put differently, the cooling fan 31 generates airflow directed to the rearward. The front side of the cooling fan 31 herein corresponds to the intake side of the cooling fan 31. The cooling fan 31 is disposed rearward of the radiator 32. The grill 33 defines the rear face of the cooling compartment 3.

During actuation of the cooling fan 31, air existing in the engine compartment 2 is discharged to the cooling compartment 3 through the communication port 91 of the partition wall 9. As a result, hot air existing in the engine compartment 2 is discharged to the cooling compartment 3. On the other hand, external air flows into the engine compartment 2 through the ventilation parts 81a and so forth.

Figure 5:
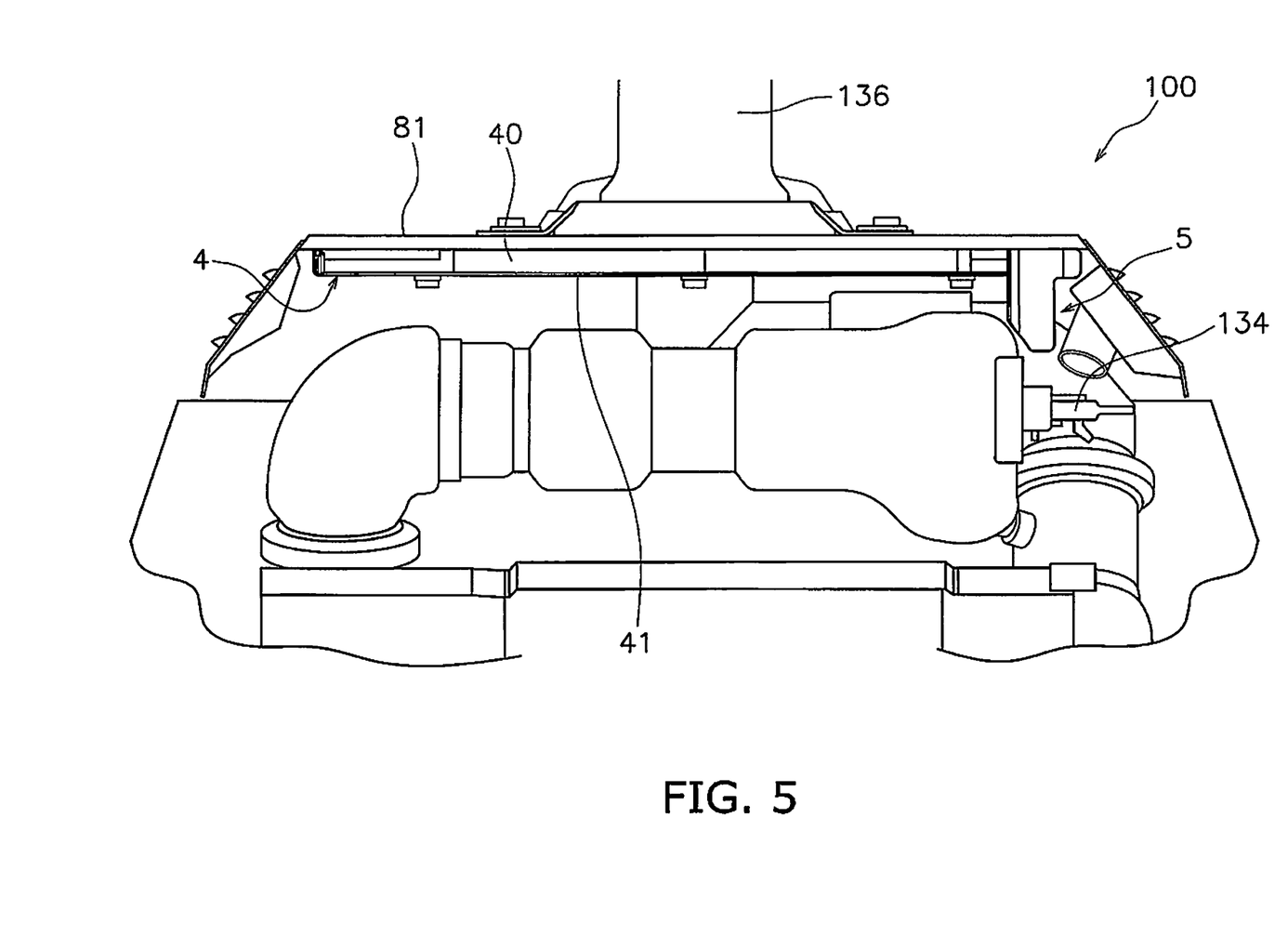
FIG. 5 is a cross-sectional view of the rear side vehicle body seen from a rear side thereof.

FIG. 5 is a cross-sectional view of the rear side vehicle body 120b seen from rear. As shown in FIG. 5, the wheel loader 100 further includes the first guide member 4 and a second guide member 5. The first guide member 4 and the second guide member 5 are integrally formed. It should be noted that the first guide member 4 and the second guide member 5 may not be integrally formed. The first guide member 4 and the second guide member 5 are configured to discharge the hot air existing around the injection device 134 to the outside.

Figure 6:
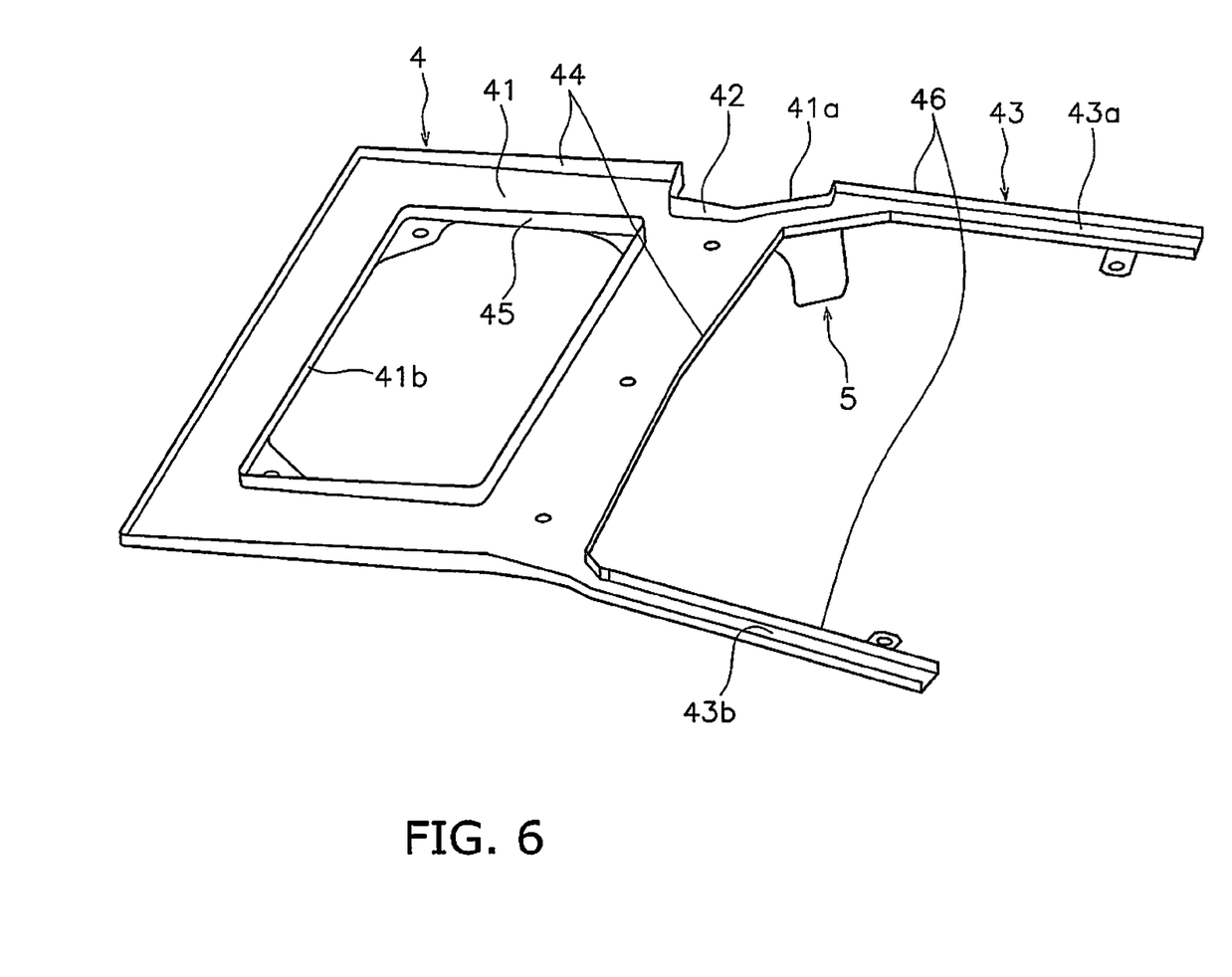
FIG. 6 is a perspective view of first and second guide members.
Figure 7:
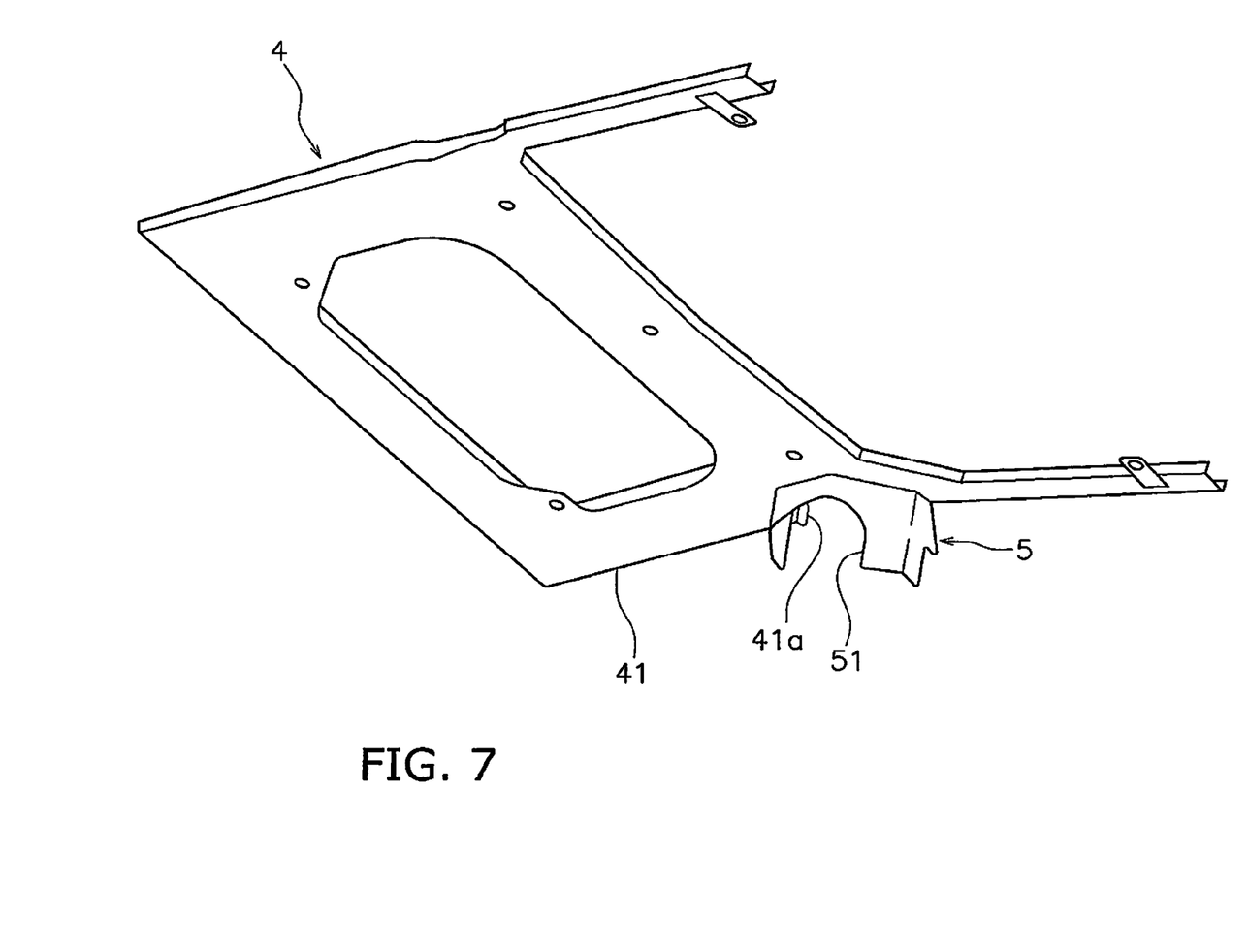
FIG. 7 is a lower perspective view of the first and second guide members.

FIG. 6 is a perspective view of the first and second guide members 4 and 5 seen from top left, whereas FIG. 7 is a perspective view of the first and second guide members 4 and 5 seen from bottom left.

As shown in FIGS. 6 and 7, the first guide member 4 has a guide body 41, a first folded part 42 and an extending part 43. It should be noted that the first folded part 42 corresponds to a folded part of the present invention. The extending part 43 is composed of a first extending part 43a and a second extending part 43b.

The guide body 41 is configured to direct air existing over the injection device 134 to at least one ventilation part 81a. When described in detail, the guide body 41 composes a part of a first channel 40. The first channel 40 is configured to direct the air existing over the injection device 134 to at least one ventilation part 81a. The guide body 41 has a plate shape. The guide body 41 is attached to the top plate 81 by, for instance, a mount bracket and so forth.

Figure 8:
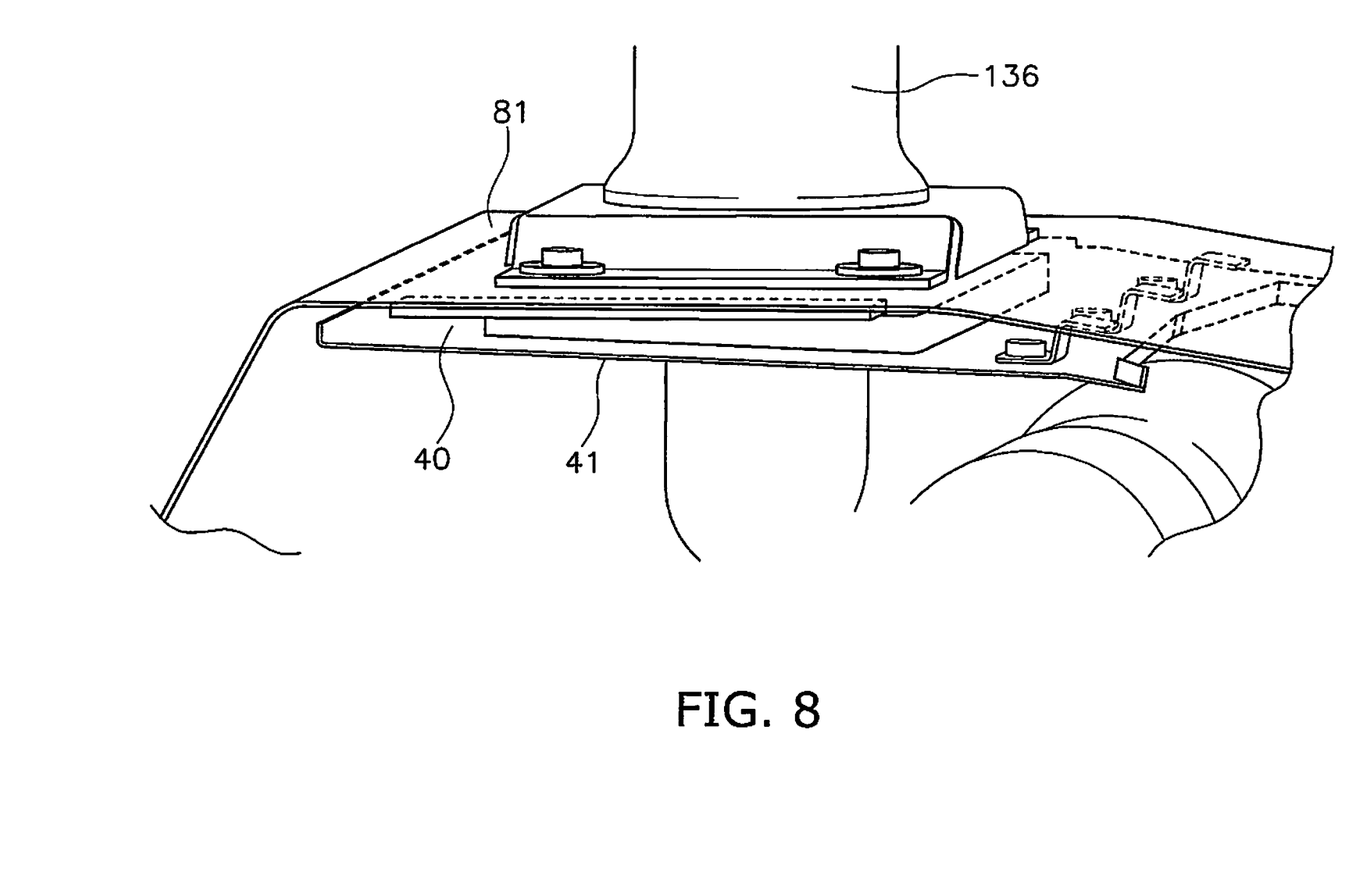
FIG. 8 is a cross-sectional view of the rear side vehicle body.

FIG. 8 is a cross-sectional view of the rear side vehicle body 120b seen from a left side thereof. As shown in FIGS. 5 and 8, the guide body 41 is disposed along the top plate 81. The guide body 41 composes the first channel 40 in corporation with the top plate 81. Put differently, the first channel 40 is produced between the guide body 41 and the top plate 81. The hot air is discharged through the first channel 40. It should be noted that the first channel 40 tilts down to the rear in the back-and-forth direction. With the construction, when water exists within the first channel 40, the water flows rearward.

As shown in FIG. 3, the guide body 41 is disposed to cover the respective ventilation parts 81a from below. Specifically, the guide body 41 is disposed in the surrounding of the exhaust pipe 136 in a plan view. The guide body 41 is configured to receive water that intrudes into the engine compartment 2 through the respective ventilation parts 81a.

As shown in FIGS. 6 and 7, the guide body 41 has a cutout part 41a. The cutout part 41a is formed by cutting out the guide body 41. The guide body 41 extends from the cutout part 41a to the respective ventilation parts 81a.

The cutout part 41a is disposed in such a position that the hot air, rising from the surrounding of the injection device 134, passes therethrough. Put differently, the cutout part 41a is disposed over the injection device 134. Specifically, the cutout part 41a is disposed immediately above the injection device 134.

When the hot air existing around the injection device 134 rises, the hot air flows into the first channel 40 through the cutout part 41a. Then, the hot air flowing through the first channel 40 is discharged to the outside of the engine compartment 2 through the respective ventilation parts 81a.

As shown in FIG. 6, the first folded part 42 is disposed to enclose the cutout part 41a on the circumferential edge of the cutout part. Put differently, the first folded part 42 upwardly extends from the guide body 41 on the circumferential edge of the cutout part 41a. It should be noted that the first folded part 42 has a certain height to not contact the top plate 81. Put differently, clearance is produced between the upper end of the first folded part 42 and the top plate 81. The hot air from the cutout part 41a is introduced into the first channel 40 through the clearance.

The first guide member 4 is configured to receive water that intrudes into the engine compartment 2 through the respective ventilation parts 81a. Put differently, the first guide member 4 further has a second folded part 44. The second folded part 44 is formed along the outer peripheral edge of the guide body 41. The second folded part 44 can prevent the water received by the guide body 41 from falling down from the outer peripheral edge of the guide body 41. It should be noted that the second folded part 44 is formed continuously to the first folded part 42.

Additionally in the present exemplary embodiment, the guide body 41 has an opening part 41b in the middle part thereof to avoid contact with the exhaust pipe 136. Moreover, the first guide member 4 further has a third folded part 45. The third folded part 45 is disposed to enclose the opening part 41b. Specifically, the third folded part 45 is formed along the inner peripheral edge of the guide body 41. The third folded part 45 can prevent the water received by the guide body 41 from falling down through the opening part 41b.

The first and second extending parts 43a and 43b extend from the guide body 41 to the outside of the engine compartment 2. The first extending part 43a backwardly extends along the right lateral face of the engine compartment 2. The second extending part 43b backwardly extends along the left lateral face of the engine compartment 2. When described in detail, as shown in FIG. 3, the first extending part 43a is disposed on the right side of the opening part 81b in a plan view. On the other hand, the second extending part 43b is disposed on the left side of the opening part 81b in the plan view. With this construction, when the cover 18c is removed, devices mounted within the engine compartment 2 are accessible through the opening part 81b. Put differently, in accessing the devices mounted within the engine compartment 2 through the opening part 81b, the first and second extending parts 43a and 43b do not obstruct the access.

Figure 9:
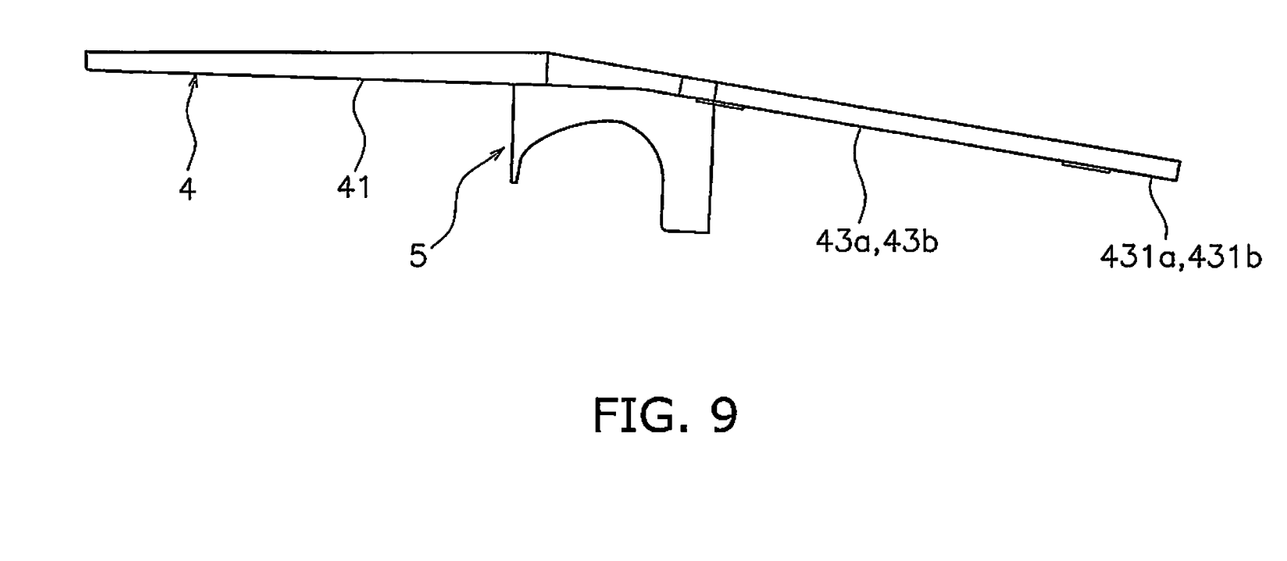
FIG. 9 is a side view of the first and second guide members.

FIG. 9 is a side view of the first and second guide members 4 and 5 seen from the left side. As shown in FIG. 9, the first and second extending parts 43a and 43b tilt down toward the tip ends thereof. It should be noted that the first and second extending parts 43a and 43b backwardly extend from the guide body 41. Hence, the tip ends of the first and second extending parts 43a and 43b mean the rear ends thereof. Put differently, the first and second extending parts 43a and 43b tilt down toward the rear ends thereof.

The rear ends 431a and 431b of the respective extending parts 43a and 43b are located outside the engine compartment 2. Specifically, the rear ends 431a and 431b of the respective extending parts 43a and 43b are located within the cooling compartment 3. The partition wall 9 has cutout parts on the upper end thereof. The respective extending parts 43a and 43b extend to the cooling compartment 3 through the cutout parts of the partition wall 9. According to this construction, the first guide member 4 attached to the top plate 81 is detachable together with the top plate 81.

The guide body 41 tilts down toward the first and second extending parts 43a and 43b. In the present exemplary embodiment, the first and second extending parts 43a and 43b are joined to the rear end of the guide body 41. The guide body 41 tilts down to the rear. It should be noted that the tilt angle of the guide body 41 is smaller than the tilt angles of the first and second extending parts 43a and 43b.

Thus, the guide body 41 tilts, and accordingly, rainwater and so forth received by the guide body 41 flow toward the first and second extending parts 43a and 43b. Additionally, the first and second extending parts 43a and 43b also tilt, and accordingly, when flowing down to the first and second extending parts 43a and 43b, rainwater and so forth flow rearward. The respective rear ends 431a and 431b of the first and second extending parts 43a and 43b are located outside the engine compartment 2. Hence, rainwater flowing down along the first and second extending parts 43a and 43b is discharged to the outside of the engine compartment 2.

The first and second extending parts 43a and 43b have a fourth folded part 46. The fourth folded part 46 is formed along the outer peripheral edges of the first and second extending parts 43a and 43b. It should be noted that the second folded part 44 formed on the guide body 41 and the fourth folded part 46 formed on the respective extending parts 43a and 43b are continued to each other. Additionally, the fourth folded part 46 is also formed continuously to the first folded part 42. With the construction, it is possible to cause water received by the guide body 41 to flow to the respective extending parts 43a and 43b.

Figure 10:
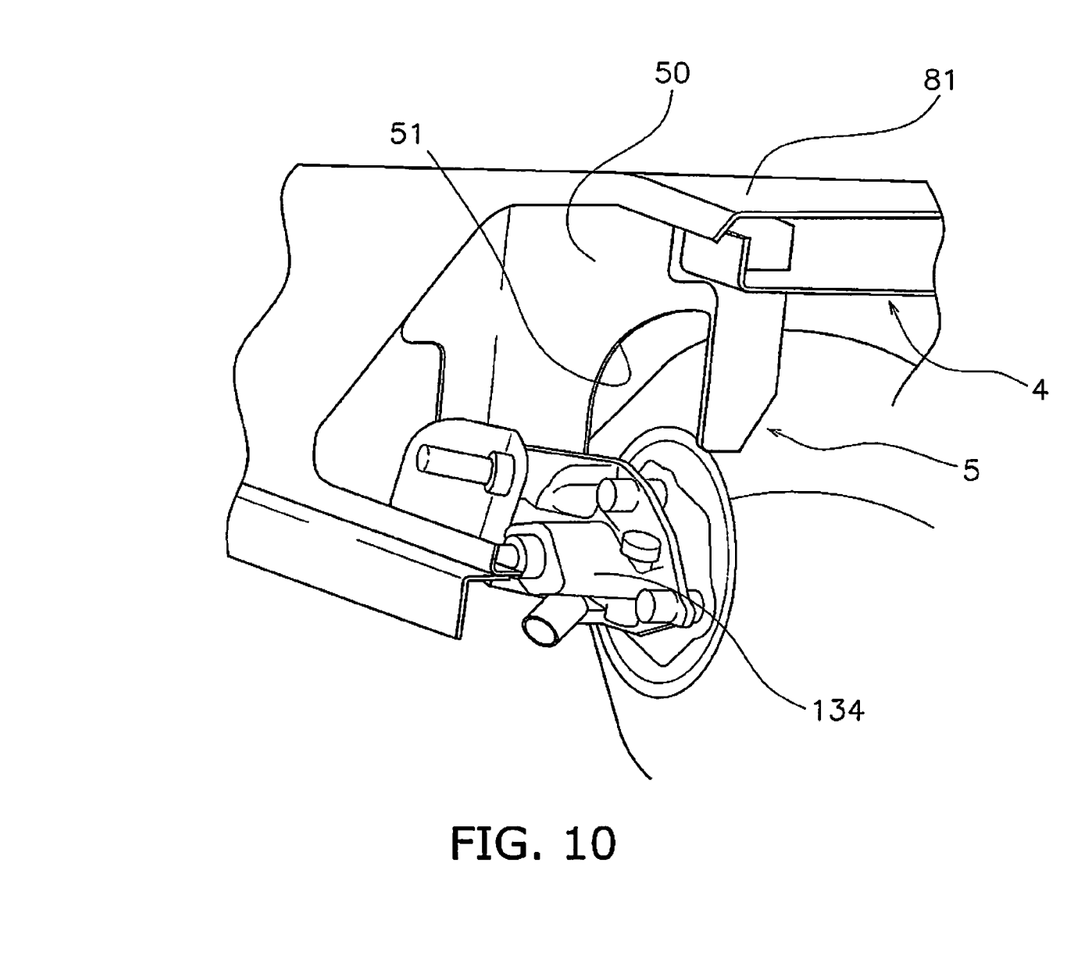
FIG. 10 is a perspective view of the second guide member.

FIG. 10 is a perspective view of the second guide member 5 seen from a front right side thereof. It should be noted that in FIG. 10, a part of the top plate 81 is not illustrated for easy understanding of the drawing. As shown in FIG. 10, the second guide member 5 is disposed over the injection device 134. The second guide member 5 extends in the up-and-down direction between the cutout part 41a of the first guide member 4 and the injection device 134. The second guide member 5 has a semi-cylindrical shape. It should be noted that the second guide member 5 has a cutout part 51 to avoid interference with the connection pipe 132 (see FIG. 7).

The second guide member 5 composes a second channel 50, which extends over the injection device 134 in the up-and-down direction, in corporation with a lateral face of the engine compartment 2. Specifically, the second guide member 5 composes the second channel 50 in corporation with part of the top plate 81. The second channel 50 extends immediately above the injection device 134 in the up-and-down direction.

As shown in FIGS. 6 and 7, the upper end of the second guide member 5 is attached to the first guide member 4. The second guide member 5 extends from the cutout part 41a toward the injection device 134. When described in detail, the upper end of the second guide member 5 is attached to the guide body 41. With the construction, the second channel 50 and the first channel 40 communicate with each other through the cutout part 41a.

The up-and-down directional distance between the lower end of the second guide member 5 and the upper end of the injection device 134 is preferably set to be, for instance, roughly greater than or equal to 15 mm and less than or equal to 50 mm, although not particularly limited thereto. With such distance setting, the second guide member 5 can efficiently direct the hot air existing around the injection device 134 to the cutout part 41a.

In the wheel loader 100 constructed as described above, when the cooling fan 31 is actuated, the hot air existing in the engine compartment 2 is discharged to the cooling compartment 3 through the communication port 91 of the partition wall 9. Additionally, external air flows into the engine compartment 2 through the respective ventilation parts 81a and so forth. As a result, the injection device 134 can be inhibited from being exposed to the hot air.

When the cooling fan 31 is not actuated, the hot air existing around the injection device 134 is discharged to the outside of the engine compartment 2 through the respective ventilation parts 81a while being directed thereto by the first guide member 4 and the second guide member 5. When described in detail, the hot air existing around the injection device 134 rises within the second channel 50 and is introduced into the first channel 40 through the cutout part 41a. The hot air introduced into the first channel 40 is discharged to the outside of the engine compartment 2 through the respective ventilation parts 81a. Consequently, the injection device 134 can be inhibited from being exposed to the hot air.

The respective ventilation parts 81a are not located immediately above the injection device 134 but are located in positions horizontally away from the injection device 134. With the construction, the injection device 134 can be prevented from being exposed to rainwater and so forth falling through the respective ventilation parts 81a.

The first folded part 42 can prevent rainwater attached to the guide body 41 from flowing along the guide body 41 and then falling through the cutout part 41a onto the injection device 134.

The first guide member 4 is disposed beneath the respective ventilation parts 81a and is configured to receive water that intrudes into the engine compartment 2 through the respective ventilation parts 81a. According to this configuration, the first guide member 4 can receive water that has intruded into the engine compartment 2 through the respective ventilation parts 81a. As a result, a variety of devices and so forth, accommodated in the engine compartment 2, can be prevented from being exposed to falling water.

Additionally, the water received by the first guide member 4 can be discharged to the outside of the engine compartment 2 through the first and second extending parts 43a and 43b.

[Modifications]

The exemplary embodiment of the present invention has been described above. However, the present invention is not limited to the above, and a variety of changes can be herein made without departing from the scope of the present invention.

Modification 1

An opening part may be formed instead of the cutout part 4I a formed in the guide body 41.

Modification 2

In the aforementioned exemplary embodiment, the injection device 134 has been exemplified as an exemplary cooling target member of the present invention. However, the cooling target member is not limited to the injection device 134 as long as the cooling target member is disposed in the engine compartment 2.

Modification 3

In the aforementioned exemplary embodiment, the second guide member 5 has a semi-cylindrical shape. However, the shape of the second guide member 5 is not particularly limited to the above as long as the hot air existing around the injection device 134 can be directed upward. For example, the second guide member 5 may have a tubular shape. According to the construction, the second guide member 5 can more efficiently direct the hot air existing around the injection device 134 to the upward.

Modification 4

In the aforementioned exemplary embodiment, the engine compartment 2 and the cooling compartment 3 communicate through the communication port 91. However, the engine compartment 2 and the cooling compartment 3 may not communicate with each other. In the construction, even when the cooling fan 31 is actuated, the hot air existing in the engine compartment 2 is not discharged to the cooling compartment 3. Therefore, even when the cooling fan 31 is actuated, the hot air existing around the injection device 134 flows through the first and second channels 40 and 50, and is then discharged to the outside of the engine compartment 2 through the respective ventilation parts 81a.

Modification 5

Figure 11:
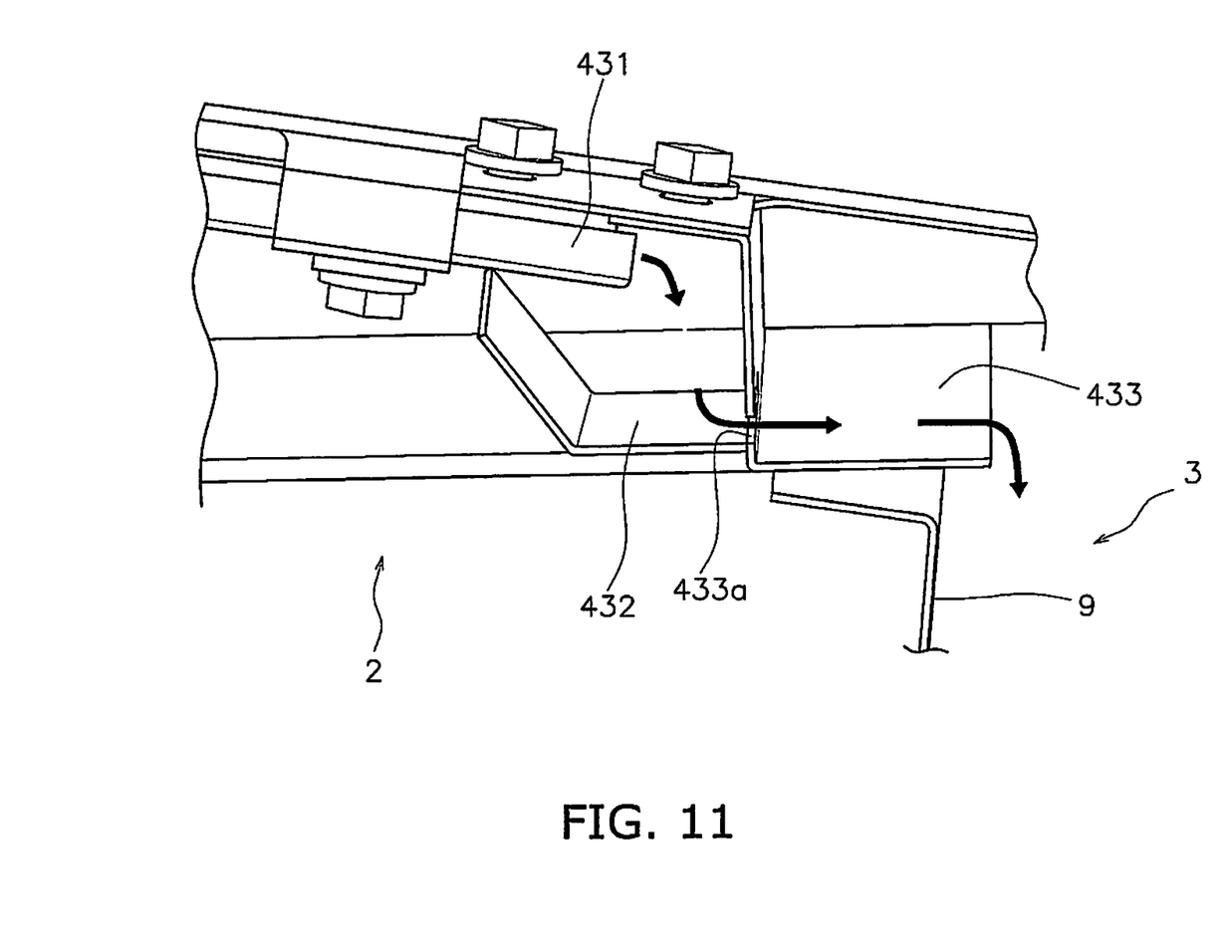
FIG. 11 is a cross-sectional side view of a rear side vehicle body in accordance with another exemplary embodiment of the present invention.

In the aforementioned exemplary embodiment, the respective extending parts 43a and 43b are constructed by a single member. However, the construction of the extending parts 43a and 43b is not particularly limited to the above. For example, as shown in FIG. 11, each extending part 43a, 43b may be configured to include an extended body 431, a receiver part 432 and a discharge part 433. It should be noted that FIG. 11 is a cross-sectional side view of the rear side vehicle body.

The extended body 431 backwardly extends from the guide body 41. The receiver part 432 is disposed beneath the rear end of the extended body 431 to receive rainwater and so forth that flow and fall from the rear end of the extended body 431. The discharge part 433 communicates with the receiver part 432 through a communication hole 433a. Rainwater and so forth flow from the receiver part 432 to the discharge part 433 through the communication hole 433a. The discharge part 433 extends to the cooling compartment 3 across the partition wall 9. With the construction, when flowing to the discharge part 433, rainwater and so forth are discharged to the cooling compartment 3 across the partition wall 9.

Modification 6

The wheel loader 100, to which the present invention is applied, has been explained in the aforementioned exemplary embodiment. However, the present invention is also applicable to other work vehicles, such as a motor grader.

The invention claimed is:

1. A work vehicle, comprising:
an engine;
an engine compartment accommodating the engine;
a cooling target member disposed in the engine compartment;
a top plate having a ventilation part and defining a top face of the engine compartment, the ventilation part being disposed in a position horizontally spaced from the cooling target member, the ventilation part including at least one through hole penetrating the top plate in a vertical direction of the work vehicle;
a first guide member having a cutout part or a first opening part disposed over the cooling target member, the first guide member extending from the cutout part or the first opening part to the ventilation part, the first guide member covering the ventilation part from below; and
a second guide member extending in an up-and-down direction between the cutout part or the first opening part and the cooling target member, the second guide member having a semi-cylindrical shape,
the second guide member and a lateral face of the engine compartment forming a channel extending over the cooling target member in the up-and-down direction.

2. The work vehicle recited in claim 1, wherein
the first guide member has a folded part extending upward on a circumferential edge of the cutout part or the first opening part.

3. The work vehicle recited in claim 2, wherein
the first guide member has a plate shape and is attached to the top plate.

4. The work vehicle recited in claim 3, wherein
the first guide member has an extending part extending to the outside of the engine compartment.

5. The work vehicle recited in claim 4, wherein
the extending part extends rearward, and
the first guide member tilts down rearward.

6. The work vehicle recited in claim 5, wherein
the extending part has a first extending part and a second extending part, the first extending part extending rearward along a right lateral face of the engine compartment, the second extending part extending rearward along a left lateral face of the engine compartment,
the top plate has a second opening part extending in a vehicle width direction,
the first extending part is disposed on the right side of the second opening part in a plan view,
the second extending part is disposed on the left side of the second opening part in the plan view, and
the second opening part is covered with a detachable cover.

7. The work vehicle recited in claim 6, wherein
the second guide member is attached at an upper end thereof to the first guide member.

8. The work vehicle recited in claim 7, further comprising
a selective catalytic reduction device configured to process exhaust gas from the engine; and
a connection pipe connected to the selective catalytic reduction device,
the cooling target member being an injection device configured to inject a reductant into the connection pipe.

9. A work vehicle, comprising:
an engine;
an engine compartment accommodating the engine;
a cooling target member disposed in the engine compartment;
a top plate having a ventilation part and defining a top face of the engine compartment, the ventilation part being disposed in a position horizontally spaced from the cooling target member, the ventilation part including at least one through hole penetrating the top plate in a vertical direction of the work vehicle; and
a first guide member having a cutout part or a first opening part disposed over the cooling target member, the first guide member extending from the cutout part or the first opening part to the ventilation part, the first guide member covering the ventilation part from below,
the first guide member having an extending part extending to the outside of the engine compartment.

10. The work vehicle recited in claim 9, further comprising
a second guide member extending in an up-and-down direction between the cutout part or the first opening part and the cooling target member.

11. The work vehicle recited in claim 10, wherein
the second guide member and a lateral face of the engine compartment form a channel extending over the cooling target member in the up-and-down direction.

12. The work vehicle recited in claim 10, wherein
the second guide member is attached at an upper end thereof to the first guide member.

13. The work vehicle recited in claim 9, wherein
the first guide member has a folded part extending upward on a circumferential edge of the cutout part or the first opening part.

14. The work vehicle recited in claim 9, wherein
the first guide member has a plate shape and is attached to the top plate.

15. The work vehicle recited in claim 9, wherein
the extending part extends rearward, and
the first guide member tilts down rearward.

16. A work vehicle, comprising:
an engine;
an engine compartment accommodating the engine;
a cooling target member disposed in the engine compartment;
a top plate having a ventilation part and defining a top face of the engine compartment, the ventilation part being disposed in a position horizontally spaced from the cooling target member; and a first guide member having a cutout part or a first opening part disposed over the cooling target member, the first guide member extending from the cutout part or the first opening part to the ventilation part, the first guide member covering the ventilation part from below, the first guide member having an extending part extending to the outside of the engine compartment, the extending part having a first extending part and a second extending part, the first extending part extending rearward along a right lateral face of the engine compartment, the second extending part extending rearward along a left lateral face of the engine compartment, the top plate having a second opening part extending in a vehicle width direction, the first extending part being disposed on the right side of the second opening part in a plan view, the second extending part being disposed on the left side of the second opening part in the plan view, and the second opening part being covered with a detachable cover.

17. A work vehicle, comprising:

an engine;

an engine compartment accommodating the engine;

a cooling target member disposed in the engine compartment;

a top plate having a ventilation part and defining a top face of the engine compartment, the ventilation part being disposed in a position horizontally spaced from the cooling target member, the ventilation part including at least one through hole penetrating the top plate in a vertical direction of the work vehicle;

a first guide member having a cutout part or a first opening part disposed over the cooling target member, the first guide member extending from the cutout part or the first opening part to the ventilation part, the first guide member covering the ventilation part from below;

a selective catalytic reduction device configured to process exhaust gas from the engine; and a connection pipe connected to the selective catalytic reduction device, the cooling target member being an injection device configured to inject a reductant into the connection pipe.

* * * * *